Patented Apr. 19, 1927.

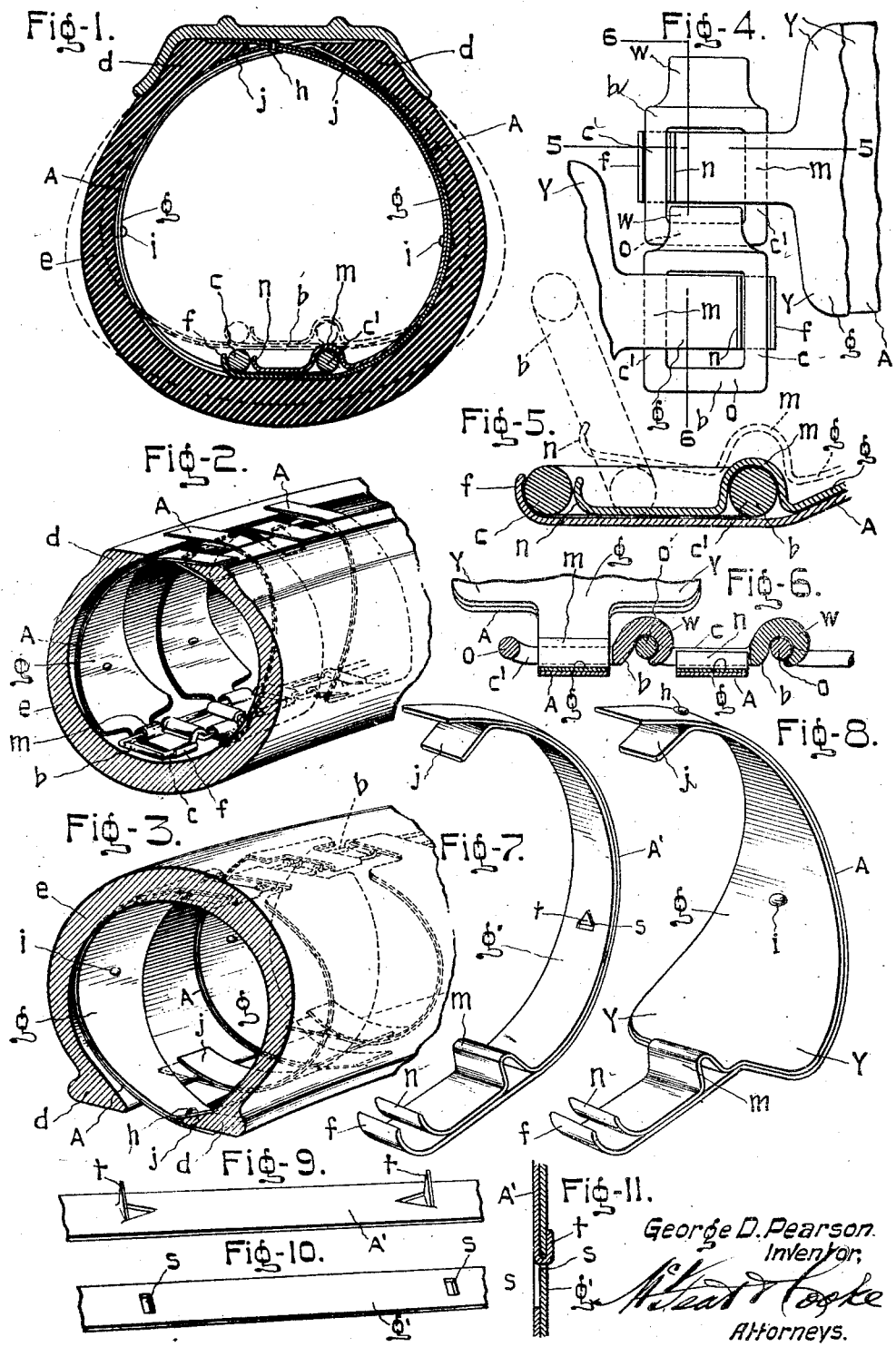

1,625,679

UNITED STATES PATENT OFFICE.

GEORGE D. PEARSON, OF MONTREAL, QUEBEC, CANADA.

AUTOMOBILE TIRE.

Application filed January 27, 1926. Serial No. 84,204.

It has been proposed to employ spring elements of various kinds in substitution for the inner pneumatic tubes of tires, but there have been many serious disadvantages attendant upon the use of these spring elements. More specifically stated it has been proposed to employ a spring element consisting of two series of springs located on the opposite sides of the median outer circumferential line of the tire and pivotally connected along such median line to a chain of links presenting at their circumferential sides, hinge members to which the outer ends of the springs are pivotally connected, the units of one series alternating with the units of the other series in their connection to these hinge bars. The principal difficulty experienced in connection with this form of device was the difficulty experienced in equipping the outer tube or carcass of a tire with the spring element and also the difficulty in removing and renewing a broken spring. Another disadvantage experienced was that the openings in the chain to which the outer ends of the springs were hinged offered vulnerable spots around the circumference of the tread through which stones and protuberances on the road were liable to weaken the tire and endanger tearing or breaking of it. This latter condition was aggravated by the fact that the hinged connection between the links of the chain present a swelling bearing upon the inner surface of the tread portion of the tire. Other forms of spring elements proposed which did not provide for the hinged connection along the outer circumferential median line of the tire were short-lived because of the low breaking strength of springs when subjected to compression without the relief offered by the pivotal connection. It may be explained that this pivotal connection along the median line of the tire has an action of the nature of a toggle joint with all its advantages in relieving the springs of breaking strains.

The various defects referred to have been overcome by my invention which consists broadly speaking of a spring element the alternating spring members of which are connected together at their outer ends by readily detachable toggle joints presenting protecting covers for the openings in the chain and between the latter and the inner surface of the tread of the tire, thus affording a comparatively smooth surface bearing against the inner wall of the tire. In conjunction with the improved toggle joint the links of the chain are displaced at one side of each link inwardly to eliminate the swelling at this point in the toggle joints as heretofore employed. More specifically stated each spring element consists of leaf springs, the ends of each of which are of double leaf form to present readily detachable toggle joint connections at the outer end and a V form at the inner end to engage the beads through which the inner edges of the side of the tire are held in the rim; while the hinged bars presented by one side of each link of the chain are off-set or displaced inwardly, thus causing the chain to lie flat. This eliminates the swelling occurring in the chain produced by the points of the hooks. Another feature of my improvement is that the main member of each spring is extended in width from its outer to its inner end for the purpose of supporting the wall of the tire throughout its area.

For full comprehension, however, of my invention reference must be had to the accompanying drawings in which similar reference characters indicate the same parts and wherein:

Figure 1 is a transverse sectional view of a case or carcass of a tire furnished with my improved spring element;

Figures 2 and 3 are fragmentary perspective views thereof; in Figure 2 the chain connection between the springs and in Figure 3 the construction for the spring ends engaging the edges of the casing are shown in perspective;

Figure 4 is a plan view of a section of my improved spring element including a pair of hinged links;

Figure 5 is a sectional view taken on line 5—5 Figure 4 with the readily detachable spring members shown in the act of being fitted in place or disconnected;

Figure 6 is a sectional view taken on line 6—6 Figure 4 and illustrating particularly the readily detached toggle joint through which the outer ends of the spring members are hingedly connected together;

Figure 7 is a perspective view of one of the spring members as constructed for the tires of a relatively small car;

Figure 8 is a perspective view of a spring member for a spring element suitable for the tires of a relatively large heavy car or truck; and Figures 9, 10 and 11 illustrate a means for securing the members of each spring together, Figure 11 being a sectional view showing the position of the parts locked together.

According to the preferred embodiment of my invention the spring members A act in conjunction with the chain of rectangular links $b$, the opposite circumferential sides $c$ and $c^1$ respectively of which are in the form of hinge pins of round cross section suitable to coact with a knuckle such as is required for a toggle joint. Each of the spring members consists of a leaf spring of sufficient length to extend from one of the attachment beads $d$ of the tire case or carcass $e$ around one-half of the interior of the case and between the chain and the inside surface of the tread to the opposite side of the chain. Its end is curved to present a lip $f$ to partially enclose the side bar $c$ of the chain. This end of the spring member it will be noted extends completely across and affords a smooth cover for the face of the link which otherwise would rest in contact with the inner surface of the tread; and in order to readily detachably connect this end of the spring member to the link the main spring is provided with a supplemental spring leaf member $g$. This spring leaf member is in the form of a unitary leaf spring member $g$ fastened in place as at $h$ and $i$. One end of the spring leaf $g$ is sprung out as at $j$ from the end of the leaf A and set in that position for the purpose of fitting snugly on the bead $d$. The opposite end of the leaf $g$ is formed with a corrugation $m$ adapted to engage and snugly fit the bar $c^1$ of the link while the extremity thereof is bent to present a curved lip $n$ to lie in close proximity to the side bar $c$ of the link opposite to that side engaged by the curved lip $f$ of the main leaf. The purpose of this curved end $n$ is to in a measure localize that end of the complete spring member with relation to the link it engages and to establish an effective toggle joint. The lip $n$ also facilitates the engagement of the spring member with the link. It will be observed that when the tire is compressed as indicated in dotted lines in Figure 1 that the hinged relation is an effective toggle joint and tendency to distort the position of the link relatively to the inner surface of the tread is obviated. This is important because the distortion sets up strains and stresses in the chain and the ends of the spring members in connection therewith which results in breakage of the springs. The toggle joint is entirely within the line of the main leaf spring A, and as the same relation between the spring members on the opposite side exists, this toggle arrangement is established throughout the complete outer circumference of the tire. Figure 2 illustrates clearly the relation of several of the toggle joints to the tread of the tire. This relation being also clearly shown in dotted lines in Figure 3.

The particular construction of the end of the spring member lends itself readily to the setting of the spring in place in engagement with the chain and also to remove a defective spring, this being clearly illustrated in Figure 5. The construction of the ends of the springs to engage the beads at the inner edges of the sides of the tire case or carcass are shown in detail in Figures 7 and 8, Figures 4, 5, and 6 showing the detail construction of the toggle connection.

The connection between the main and auxiliary leaf springs are preferably by slots $s$ and clips $t$ in the respective spring members; the clips being inserted through the slots and bent over as shown in the spring members indicated at A' and $g'$ in Figures 7, 9 and 10. I prefer to strike out the clip $t$ from the spring member in which it is formed, thus avoiding the necessity of riveting as at $i$ in Fig. 8 and I also prefer to turn the clip at $t$ in the opposite direction from which the clip at $h$ is turned.

In order to support a tire throughout its area each main leaf of each spring member is extended in width from its outer to its inner end as shown at $y$ in Figure 8. The position of the spring members where they cross the links and the even bearing of the entire spring element on the interior of the casing is obtained and the smoothness of these bearing surfaces is due in a large measure to the fact that the hinged bars $o$ of the links are displaced inwardly, thus throwing the ends of the hinged hook $w$ back within the line of the inside of the tire.

When tires of automobiles, coaches, trucks, or of light weight cars provided with my improved spring element the compression due to the load carried is absorbed by the springs instead of by air and consequently when an obstruction is met on the road surface, such as where a highway crosses a railroad, for instance, instead of a bump being felt by the passengers of the car the springs successively climb the obstacle. Thus the impact is absorbed by the contacting springs and consequently without the shock experienced with the impact is absorbed and the shock felt by the confined body of air within the tire. It is largely due to the extension of the springs across the links without interfering with the pivotal connection between the links and yet presenting effective toggle joints, that the durable and smooth running qualities of automobiles, motorcycles and other cushion-tired vehicles equipped with my invention may be secured without depending upon pneumatic tires with the accompanying serious disadvantages of blow-outs and punctures.

What I claim is as follows:

1. A tire comprising the combination with a tire casing of a spring element within the same and consisting of two series of leaf springs located respectively at opposite sides of the tire, the springs of one series being in pivotal relation with the springs of the other series, and means whereby a smooth surface is presented by the spring element to the inside surface of the tread.

2. A tire such as claimed in claim 1 distinguished by the means for presenting the smooth surface consisting of a pivoted end of each spring extending over a pivotal connection therewith and between the same and the inside surface of the tire casing.

3. A tire such as claimed in claim 1 having a chain of rectangular links extending completely around the median line of the outer circumference within the tire casing, and having the springs pivotally connected to the sides of the links and each presenting an extension projecting over the link to which it is connected and between the same and the inner surface of the tread.

4. A tire of the type described comprising, in combination a tire casing, a chain of rectangular links pivoted together, two series of leaf springs, the springs of each series being in pivotal connection with and readily detachably engaging the sides of alternate links and springs at one side alternating with the springs of the opposite side.

5. A tire such as claimed in 4, the springs of which have projections extending across the links between the same and the inner surface of the tread.

6. A tire such as claimed in claim 4, the pivotal connection between the leaf springs and the chain consisting of the spring ends extending across the link between the same and the inner surface of the tread, and a supplemental spring device secured to the spring and presenting a corrugation engaging the contiguous side of the link for the purpose of providing a readily detachable connection.

7. A tire of the type described comprising in combination a tire casing, a chain of rectangular links pivoted together, two series of leaf springs, the springs of each series readily detachably engaging the sides of alternate links and springs at one side alternating with the springs of the opposite side, such springs having projections extending across the links between the same and the inner surface of the tread, a supplemental spring member secured to the main spring and presenting a corrugation engaging the contiguous side of the link, and the end of the said supplemental spring member having its end extending to within close proximity of the other side of the link and having its extremity bent outwardly from the main spring for the purpose of providing a readily detachable connection.

8. A tire such as claimed in claim 4 having each spring member consisting of a main leaf projecting across the link between the same and the inner surface of the tread and its end bent to engage the far side of the link, and a supplemental spring member having a corrugation to engage the near side of the link and its extremity bent outwardly from the main spring and extending to within close proximity of the far side of the link, the said supplemental spring member being secured to the main spring and the entire spring member extending to and engaging the attachment beads along the inner edge of the opposite side of the tire.

9. A spring member for use in a tire of the type described, consisting of a main leaf having a curved lip at one end, means for presenting a supplemental spring device having a transverse corrugation near its end and at its end a curved lip contiguous to and spaced from the first mentioned curved lip, said means also presenting a second supplemental spring device secured to the main spring near the opposite end of and sprung away from the latter, and fastening devices securing the said means to the main spring near the opposite ends thereof.

10. A spring member such as claimed in claim 9, the means for presenting the supplemental spring devices consisting of a unitary leaf spring.

11. A spring member such as claimed in claim 9 the fastening devices of which for fastening the supplemental spring devices to the main spring consisting of slots in the supplemental member and clips struck up from the main spring member for the purpose of being inserted through the slots and bent to secure together the main spring and the said means.

12. A tire of the type described comprising, in combination a tire casing, a chain of rectangular links pivoted together, two series of leaf springs, the springs of each series readily detachably engaging the sides of alternate links and springs at one side alternating with the springs of the opposite side, each link of the chain having at one end a hook and at its opposite end a hinged bar for engagement with the hook of an adjoining link, the said hinged bar being displaced away from the plane of the side of the link in which the extremity of the hook lies for the purpose of causing the chain at that side to present an even surface.

13. A tire comprising the combination with a tire casing of a spring element within the same and consisting of two series of leaf springs located respectively at opposite sides of the tire, the springs of one series being in pivotal relation with the springs of the other series, and each spring being of extended width from its inner to outer end for the purpose of presenting a support for the tire casing throughout its area.

14. In a tire casing the combination with a chain inside thereof and extending around its circumferential inner face, of a spring member consisting of a leaf spring one end of which is reduced in width for pivotal connection to the chain and the opposite end being correspondingly reduced in width for fitting purposes.

In testimony whereof I have signed my name to this specification.

GEORGE D. PEARSON.